United States Patent [19]

Takami et al.

[11] Patent Number: 4,933,704
[45] Date of Patent: Jun. 12, 1990

[54] ELECTRIC POWER SUPPLY CONTROL DEVICE FOR CAMERA

[75] Inventors: Satoshi Takami; Yutaka Ohsawa, both of Tokyo, Japan

[73] Assignee: Asahi Kogaku Kogyo Kabushiki Kaisha, Tokyo, Japan

[21] Appl. No.: 366,349

[22] Filed: Jun. 15, 1989

Related U.S. Application Data

[63] Continuation of Ser. No. 76,506, Jul. 22, 1987, abandoned, which is a continuation of Ser. No. 284,575, Dec. 15, 1988, abandoned.

[30] Foreign Application Priority Data

Jul. 22, 1986 [JP] Japan .................. 61-170919

[51] Int. Cl.$^5$ .............................................. G03B 7/26
[52] U.S. Cl. ................................. 354/484; 354/400; 354/214
[58] Field of Search ................ 354/484, 400, 214

[56] References Cited

U.S. PATENT DOCUMENTS

| 4,387,977 | 6/1983 | Uchidoi et al. | 354/484 |
| 4,389,111 | 6/1983 | Uchidoi et al. | 354/484 |
| 4,429,974 | 2/1984 | Suzuki | 354/484 |
| 4,502,774 | 3/1985 | Suzuki et al. | 354/484 |
| 4,636,056 | 1/1987 | Kohayashi et al. | 354/484 |
| 4,643,558 | 2/1987 | Hasegawa | 354/484 |
| 4,676,625 | 6/1987 | Alyfuku | 354/484 |

Primary Examiner—Russell E. Adams
Attorney, Agent, or Firm—Sughrue, Mion, Zinn, Macpeak & Seas

[57] ABSTRACT

The power supply in a camera is connected to the camera control section only through a normally-off switch which is rendered conductive only when a switch is operated requesting that as camera control function be performed. The power supply is connected to the function request switches at all times, but only in a high impedance state so that there is substantially no power consumption when the camera is not actually operating.

4 Claims, 2 Drawing Sheets

ELECTRIC POWER SUPPLY CONTROL DEVICE FOR CAMERA

This is a continuation of application Ser. No. 076,506, filed July 22, 1987, which is a continuation of application Ser. No. 284,575, filed Dec. 15, 1988, now abandoned.

BACKGROUND OF THE INVENTION

1. Field of the Invention

This invention relates to an electric power supply control device for a camera in which camera control operations such as a photometric control operation and an exposure control operation are carried out by data processing in accordance with a microprogram.

2. Background of the Invention

A camera is known in the art in which camera control operations such as a photometric control operation and exposure control operation are carried out by data processing in accordance with the program of a microcomputer.

A camera of this type is a camera which has a number of photographing data to be processed according to a predetermined program, and accordingly performs a number of functions. Generally, an electric power source, i.e., a battery, is connected to a camera control section including the microcomputer when the power switch is turned on, and under this condition instruction keys comprising, e.g., a photometric switch and a shutter release switch are selectively operated for sequential execution of the program.

As described above, a microcomputer-controlled camera may perform a number of functions. However, the number of functions may result in high power consumption by the camera control section. Therefore, the camera control section is so designed as to minimize the power consumption. However, in the above-described conventional camera in which the camera control section is powered in advance with the operating switches such as a photometric switch and a shutter release switch subsequently operated, the supply of power to the camera control section is continued until the power switch is opened whether or not the camera control section is in operation. This may result in unnecessary consumption of electric power.

SUMMARY OF THE INVENTION

A primary object of this invention is to eliminate the above-described difficulty accompanying a conventional microcomputer-operated camera.

Provided according to a first aspect of the invention is an electric power supply control device, for a camera which is controlled according to data processing conducted by a microcomputer, which control device comprises: switching means rendered conductive by a control signal to electrically connect an electric power source; electric power supply operation means, including operation switches which are closed for camera operations such as photometric operation and a shutter release, for providing control signals which are applied to the switching means and the microcomputer; self-holding means which receives an instruction processing output from the microcomputer and produces a control signal to maintain the switching means conductive until a camera control operation requested by a switch operation has been completed by the microcomputer; lock means for providing lock and unlock signals, including a lock switch for producing an unlock signal when the lock switch is operated, the unlock and lock signals being supplied to the electric power supply operation means; lock response means for receiving the unlock signal to permit the production of the control signal to said switching means and for receiving the lock signal to inhibit the production of the control signal; and lock signal blocking means for blocking the lock signal in response to the control signal produced by the self-holding means.

According to a second aspect of the invention, the device further comprises: film rewinding operation means including means for generating a film rewinding signal when a film rewinding switch is operated, gate means for providing an output signal as a control signal to the switching means upon receiving the film rewinding signal and the unlock signal.

In the electric power supply control switch according to the first aspect of the invention, the switching means is rendered conductive by the control signal which is produced by the electric power supply control means in response to the closing of one of the operation switches, so that the camera control section is electrically connected to the power source. Upon completion of the corresponding operation of the camera control section, the switching means is made nonconductive by the self-holding means, so that the supply of power to the camera control section is interrupted.

The operation of the lock switch prevents the production of the control signal by the electric power supply operation means, so that the switching means is maintained non-conductive. Once a camera control section operation has begun, locking of the electric power supply operation means inhibited until the operation has been accomplished.

In the electric power supply control device according to the second aspect of the invention, the gate means is enabled by the unlock signal and is then opened by a rewinding signal produced when the film rewinding switch is operated, and the output of the gate means renders the switching means conductive so that the camera control section is energized. When the lock means is in a lock condition, the film rewinding operation is inhibited.

BRIEF DESCRIPTION OF THE DRAWINGS

The invention will be more clearly understood from the following description in conjunction with the accompanying drawings, wherein.

DETAILED DESCRIPTION OF A PREFERRED EMBODIMENT

Figure 1:
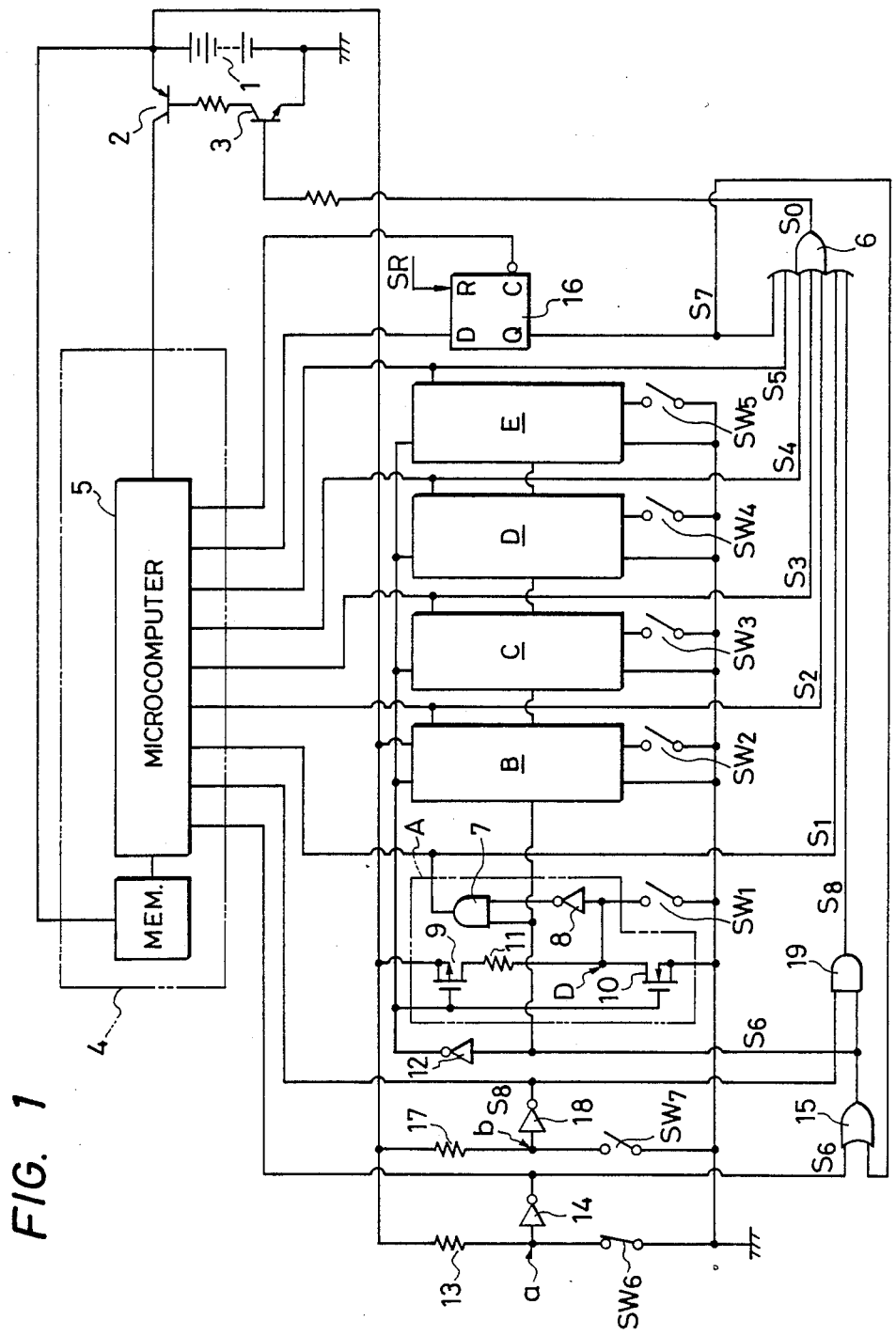
FIG. 1 is a circuit diagram, partly as a block diagram, showing the arrangement of an electric, power supply control device according to one embodiment of the invention.

One embodiment of this invention will now be described with reference to the accompanying drawings, which illustrates a circuit diagram showing the arrangement of an electric power supply control device for a camera according to the invention. In FIG. 1, reference numeral 1 designates an electric power source, i,e., a battery. Reference numerals 2 and 3 designate power supply switching means, i.e., transistors, connected between the battery 1 and a camera control section 4.

The transistor 3 is rendered conductive (on) by a control signal $S_0$ applied to its base, to provide a bias current to the base of transistor 2 and thereby render the transistor 2 conductive (on).

The camera control section 4 comprises various elements and circuits such as a photometric circuit and an exposure control circuit which are essential for camera control and are controlled by a microcomputer 5 in a known manner, and a memory device such as a conventional EPROM for storing film rewind completion data, for instance. In this case, it should be noted that the memory device is relatively low in power consumption.

Further in FIG. 1, reference characters A, B, C, D and E designate electric power supply operation circuits. These operation circuits have normally-open switches $SW_1$, $SW_2$, $SW_3$, $SW_4$ and $SW_5$ which are self-restoring, so that they return to their open condition after being operated. When the switches $SW_1$ through $SW_5$ are operated (closed), the corresponding operation circuits A through E, respectively, produce "1" level operation signals $S_1$ through $S_5$.

In this embodiment, the switch $SW_1$ is used to reset the contents of the memory device in the camera control section 4, the switch $SW_2$ is used to store photometric data, the switch $SW_3$ is a shutter release in switch, the switch $SW_4$ is a focus locking switch, and the switch $SW_5$ is a photometric switch.

The switches $SW_1$ through $SW_5$ may be operated at any time. The operation signal outputted by the electric power supply operation circuit corresponding to an operated switch, for instance the operation signal $S_1$ produced when the switch $SW_1$ is operated, is applied to an OR circuit 6 which provides the aforementioned control signal $S_0$.

The operation circuits A through E all have the same circuitry. Therefore, only the operation circuit A is shown in detail. In the electric power supply operation circuit A, an AND circuit 7 receives the output signal "1" from an inverter 8 which is produced when the switch $SW_1$ is closed, and also receives an unlock signal $S_6$ which is at the level "1". The AND gate 7 combines these two inputs to generate the operation signal $S_1$.

A p-channel FET 9 has its source is connected to the power source 1, and an N-channel FET 10 is connected through a resistor 11 to the drain of the FET 9. The FETs 9 and 10 form lock response means. The "1" level $S_6$ unlock signal (hereinafter referred to an "an $S_6$ unlock signal ("1")) or a "0" level $S_6$ lock signal (hereinafter referred to as "an $S_6$ lock signal ("0")) is applied through an inverter 12 to the gates of the FETs 9 and 10. Upon application of the $S_6$ unlock signal ("1"), the output of the inverter 12 becomes low and the FET 9 is rendered conductive while the FET 10 is rendered non-conductive. Upon application of the $S_6$ lock signal ("0"), the FET 9 is rendered non-conductive while the FET 10 is rendered conductive.

As shown in FIG. 1, the switch $SW_1$ is connected between the source and the drain of the FET 10. Therefore, when the FET 10 is rendered conductive by the $S_6$ lock signal ("0"), the switch $SW_1$ is short-circuited. However, the $S_6$ lock signal ("0") is also provided to one input of AND gate 7, thereby disabling the gate 7 and preventing the production of the operation signal $S_1$. The above description is applicable to the remaining electric power supply operation circuits B through E. That is, upon application of the $S_6$ lock signal ("0"), the production of the operation signals $S_2$ through $S_5$ are inhibited.

The $S_6$ unlock signal ("1") and the $S_6$ lock signal ("0") are outputted by locking means, namely, a lock circuit comprising a lock switch $SW_6$, a resistor 13 and an inverter 14. The lock switch $SW_6$ is a normally closed switch which is connected through the resistor 13 to the power source 1. When the switch is not operated, i.e., when it is closed, the connection point a of the switch $SW_6$ and the resistor 13 is held at a low level ("L") voltage, and the inverter 14 provides an output voltage "1" so that the $S_6$ unlock signal ("1") is produced. When the lock switch $SW_6$ is opened, the voltage at the connection point a is raised to a high level ("H"), and the inverter provides an output voltage "0", so that the $S_6$ lock signal ("0") is produced.

The $S_6$ unlock signal ("1") and the $S_6$ lock signal ("0") are supplied through an OR circuit 15 to the operation circuits A through E.

Reference numeral 16 designates a flip-flop circuit (hereinafter referred to as "an FF circuit") which forms a self-holding means. A reset signal SR is applied in advance to the input terminal R of FF circuit 16 so that the output terminal Q is reset to "0".

When electric power is supplied to the camera control section in response to the operation of one of the switches $SW_1$ through $SW_5$, during the initial period of this power supply operation the microcomputer 5 applies a set signal "1" to an input terminal D of the FF circuit 16 while also providing a clock signal to the terminal C, to thereby set the FF circuit 16, so that a signal "1" is provided as a self-holding signal $S_7$ at its output terminal Q. The self-holding signal $S_7$ is supplied to the OR circuit 6, the output of which is applied, as the power supply control signal $S_0$, to the switching means to maintain the transistor 2 conductive.

When the camera control function has been achieved according to the program of the microcomputer, the FF circuit 16 receives a set signal "0" from the microcomputer 5, so that the output terminal Q is set to "0". Therefore, the self-holding signal $S_7$ and the power supply control signal $S_0$ are eliminated, as a result of which the transistor 3 is rendered non-conductive (off), and then the transistor 2 is rendered non-conductive (off), so that the supply of power to the camera control section 4 is suspended.

On the other hand, the self-holding signal $S_7$ is also applied to the OR circuit 15. Regardless of the condition of the lock switch $SW_6$, the $S_6$ unlock signal ("1") is supplied to the electric power supply operation circuits A through E until the camera control function has been completed.

Further in FIG. 1, reference character $SW_7$ designates a film rewinding switch which, together with a resistor 17 and an inverter 18, comprises film rewinding means. The film rewinding switch $SW_7$ is a normally open switch which is connected through the resistor 17 to the power source 1. When the switch $SW_7$ is closed, the voltage at the connection point b between the switch $SW_7$ and the resistor 17 is set to a low level voltage "L". This "L" voltage is applied to the inverter 18, which provides an output signal "1", i.e., a rewinding signal $S_8$.

The rewinding signal $S_8$ is supplied through an AND circuit 19 to the OR circuit 6, which applies the power supply control signal $S_0$ to the switching means. As a result, the power supply switching means is rendered conductive to supply electric power to the camera control section, so that the film rewinding operation can be carried out.

The AND circuit 19 transmits the rewinding signal $S_8$ only when it receives the $S_6$ unlock signal ("1") and the rewinding signal $S_8$.

Figure 2:
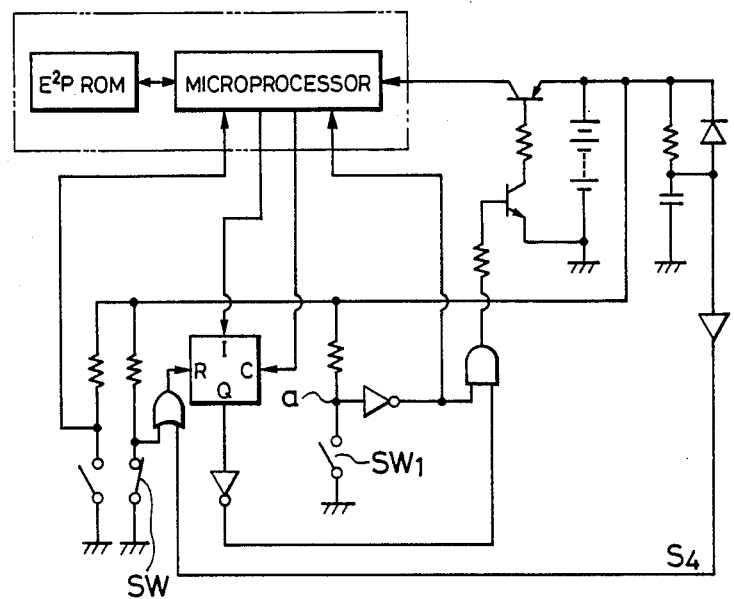
FIG. 2 is a plan view showing a rewind switch and an operating mechanism associated with the rear cover of a camera.
Figure 3:
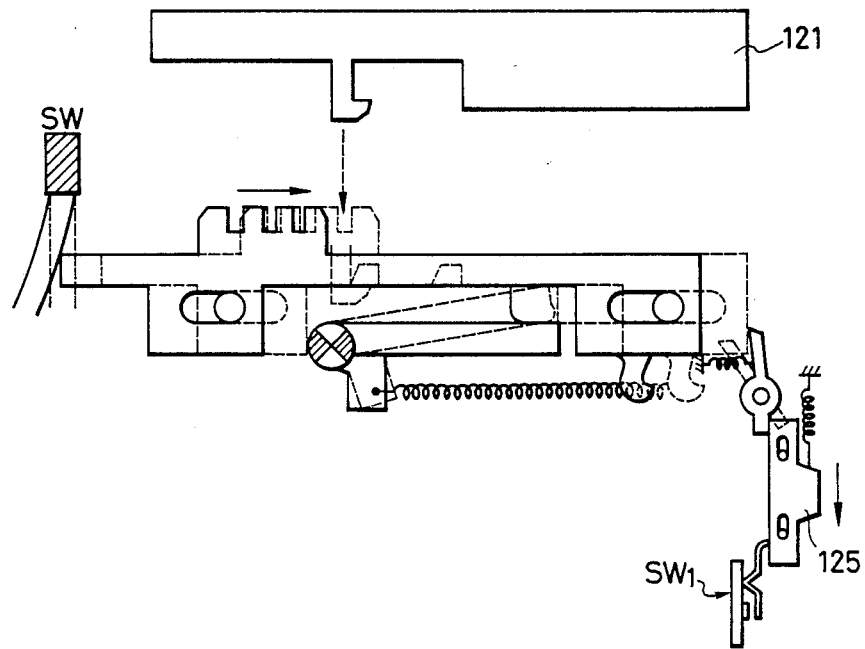
FIG. 3 is a diagram of an embodiment of a power supply circuit film winding device.

FIG. 2 is a circuit diagram showing an example of a power supply circuit in a film winding device, and FIG. 3 is a plan view illustrating a rewind switch and an operating mechanism associated with the rear cover of a camera. In FIG. 3, the rewind switch 125 which is once turned-on, is switched to an off-state when the rear cover 121 is closed. The power supply circuit of FIG. 2 has been proposed by the same inventors as those of the present application in the co-pending U.S. patent application Ser. No. 071,950 filed July 10, 1987, corresponding to U.S. Pat. No. 4,737,807 the content of which is incorporated herein by reference.

The operation of the electric power supply control device thus constructed will now be described in more detail.

When the switches $SW_1$ through $SW_7$ are not operated, i.e., all are open, none of the operation signals $S_1$ through $S_5$, self-holding signal $S_7$ and rewinding signal $S_8$ are produced, and therefore no power supply control signal $S_0$ is provided. Accordingly, the transistors 2 and 3 are "off", and the camera control section 4 is electrically disconnected from the power source 1.

Since the lock switch $SW_6$ is closed, the inverter 14 produces a "1"; level output which is passed through the gate 15 as the $S_6$ unlock signal ("1"). The $S_6$ unlock signal ("1") is supplied from the OR circuit 15 to the electric power supply operation circuits A through E, and is further applied, as an "Unlock instruction signal" to the microcomputer 5.

In the electric power supply operation circuit A, the $S_6$ unlock signal ("1") is applied one input terminal of an AND circuit 7, and the output signal "0" of the inverter 12 which receives the $S_6$ unlock signal ("1") is applied to the gates of the FETs 9 and 10, so that the FET 9 is rendered conductive while the FET 10 is rendered nonconductive.

The "H" voltage at the drain D of the FET 10 is applied to the inverter 8, which provides a low level output signal "0" The output signal "0" is applied to the other input terminal of the AND circuit 7, so that no operation signal $S_1$ ("1") is produced by the AND circuit.

In the other electric power supply operation circuits B through E, similarly as in the operation circuit A no operation signals $S_2$ through $S_5$ are produced.

When one of the switches $SW_1$ through $SW_7$ is operated, e.g., the switch $SW_1$, the "L" voltage is applied to the input of inverter 8. Therefore, the output signal "1" of the inverter 8 is applied to the other input terminal of the AND circuit 7, which produces the operation signal $S_1$. The output signal of the AND circuit 7 is applied as a data clear signal to the microcomputer 5.

As described earlier, the operation signal $S_1$ is Supplied through the OR circuit 6 as the control signal $S_0$ ("1") to the base of the transistor 3, to turn on the transistor 3. As a result, the transistor 2 is turned on so that the camera control section 4 is electrically connected to the power source 1.

Upon energization of the camera control section, the contents of the microcomputer 5 are reset. The control signal $S_0$ is maintained until the data resetting operation has been accomplished. Therefore, even if the switch $SW_1$ is opened immediately after being closed, the supply of electric power is continued until the data resetting operation is achieved.

When the data resetting operation has been accomplished, the self-holding signal $S_7$ is eliminated and therefore the control signal $S_0$ is eliminated. As a result, the transistor 3 is rendered non-conductive (off), and accordingly the transistor 2 is rendered nonconductive (off), so that the supply of electric power to the camera control section 4 is suspended.

The self-holding signal $S_7$ is further supplied to the OR circuit 15. Therefore, even if the lock switch $SW_6$ is opened during the data resetting operation, the $S_6$ unlock signal ("1") is maintained to the electric power supply operation circuit A.

When anyone of the remaining switches $SW_2$ through $SW_5$ is closed, the camera control section 4 is energized in the same manner. That is, the photometric data storing operation is carried out by closing the switch $SW_2$, the shutter release operation is performed by closing the switch $SW_3$, the focus lock operation is conducted by closing the switch $SW_4$, and the photometric operation is carried out by closing the switch $SW_5$.

As is apparent from the above description, when any one of the switches $SW_1$ through $SW_5$ is closed, the supply of power to the camera control section 4 is self-held, or continued, until the camera control function specified by the closure of the switch has been accomplished, and the $S_6$ unlock signal "1" is maintained to the electric power supply operation circuits A through E regardless of the operation of the lock switch $SW_6$. The microcomputer 5 determines the status of each of the switches $SW_1$ through $SW_5$, and executes the program accordingly.

When the rewinding switch $SW_7$ is closed, the output signal "1" of the inverter 18 is applied to the one input terminal of the AND circuit 19. The AND circuit 19 produces the rewinding signal $S_8$ when the $S_6$ unlock signal ("1") is applied to the other input terminal of the AND circuit 19.

The rewinding signal $S_8$ is supplied through the OR circuit 6 as the power supply control signal $S_0$, to render the switching means conductive. The rewinding signal $S_8$ is also supplied as a rewinding instruction signal to the microcomputer 5. As a result, the camera control section is powered, so that the film rewinding operation is carried out.

When the lock switch $SW_6$ is opened, the inverter 14 produces the $S_6$ lock signal ("0") which is supplied to the electric power supply operation circuits A through E. Therefore, in the circuit A, the "0" signal is applied to one input terminal of the AND circuit 7. At the same time, the output of the inverter 12 is raised to "1". As a result, the FET 9 is rendered non-conductive while the FET 10 is rendered conductive, and the "0" signal is applied to the inverter 8. Thus, the output signal "1" of the inverter 8 is applied to the other input terminal of the AND circuit 7.

Under this condition, even if the switch $SW_1$ is closed, the AND gate 7 is not opened. Therefore, the generation of the operation signal $S_1$ is prevented, and the supply of power to the camera control section is interrupted, so that resetting the content of the microcomputer is inhibited.

Thus, the lock switch $SW_6$ is effective in preventing unwanted power consumption by (1) causing the FET 10 to become conductive to disable the operation circuits A through E, and (2) rendering the FET 9 nonconductive so that, even if one of the switches SW₁ through SW₅ is operated, no current can flow through the resistor 11. In this case, it should also be noted that assuming that no switch SW₁ is provided in case of the resistor 11 being put in an inactive-state, the input to the inverter 8 may be left floating, and therefore the FET10 might be turned on by noise resulting in undesired power consumption in the inverter 8. In view of this difficulty, the FET10 is provided so that it is turned-on to prevent an occurrence of such undesired power consumption.

The above description is applicable to the other electric power supply operation circuits B through E, in that the camera control operations designated by the switches SW₂ through SW₅ are inhibited by operation of the switch SW₆. Also, the S₆ lock signal ("0") is applied to the other input terminal of the AND circuit 19, and therefore the rewinding signal S₈ cannot pass through the AND circuit 19. Therefore, the film winding operation is also inhibited by opening the lock switch SW₆.

In the above-described embodiment, five electric power supply operation circuits A through E are provided. However, the invention is not limited thereto or thereby. That is, the number of electric power supply operation circuits may be increased or decreased as required. The electric power supply operation circuits may also include display switches.

As will be clear from the above description, the power supply control device of the invention is so designed that the camera control section is powered only for period of time for which it should be operated. Therefore, a camera having a very low electric power consumption can be provided according to the invention. Furthermore, since the electric power supply control device includes film rewinding operation means and lock means for inhibiting the operation of the camera control section, the camera control section and the power supply control section can be made separately, and the camera control section can be simplified.

What is claimed is:

1. An electric power supply control device for a camera, said camera of the type having an electric power source and a camera control section, said camera control section performing at least one function in response to a function request signal, said control device comprising:
   power supply switching means rendered conductive by a power supply control signal to electrically connect said camera control section to said electric power source; and
   electric power supply operation means for providing said function request signal when operated, and for simultaneously providing said power supply control signal, wherein said electric power supply operation means includes at least first switch means for generating a first signal and which is responsive to said first signal for generating a first function request signal requesting the resetting of data of said camera control section, second switch means for generating a second signal and which is responsive to said second signal for generating a second function request signal requesting the storing of photometric data, third switch means for generating a third signal and which is responsive to said third signal for generating a third function request signal requesting the releasing of a shutter, and fourth switch means for generating a fourth signal and which is responsive to said fourth signal for generating a fourth function request signal requesting a focus locking operation.

2. A control device as defined in claim 1, wherein said electric power supply operation means further includes fifth switch means for generating a fifth signal and is responsive to said fifth signal for generating a fifth function request signal requesting a photometric operation.

3. An electric power supply control device for a camera, said camera of the type having an electric power source and a camera control section, said camera control section performing at least one function in response to a function request signal, said control device comprising:
   power supply switching means rendered conductive by a power supply control signal to electrically connect said camera control section to said electric power source;
   electric power supply operation means for providing said function request signal when operated, and for simultaneously providing said power supply control signal;
   lock means having a first state in which a lock signal is produced and a second state in which an unlock signal is produced;
   lock response means for receiving said lock and unlock signals and permitting the production of said power supply control signal in response to said unlock signal while inhibiting the production of said power supply control signal in response to said lock signal; and
   film rewinding operation means for supplying said rewind request signal to said camera control section when operated, and for supplying said power supply control signal to said power supply switching means only in response to both said rewinding signal and said unlock signal, wherein said camera performs a film rewind operation in response to a rewind request signal.

4. An electric power supply control device for a camera, said camera of the type having an electric power source and a camera control section, said camera control section performing at least one function in response to a function request signal, said control device comprising:
   power supply switching means rendered conductive by a power supply control signal to electrically connect said camera control section to said electric power source;
   electric power supply operation means for providing said function request signal when operated, and for simultaneously providing said power supply control signal;
   lock means having a first state in which a lock signal is produced and a second state in which an unlock signal is produced;
   lock response means for receiving said lock and unlock signals and permitting the production of said power supply control signal in response to said unlock signal while inhibiting the production of said power supply control signal in response to said lock signal; and
   means in said electric power supply operation circuit for preventing power consumption by said power supply operation circuit when said lock signal is generated.

* * * * *